United States Patent
Yoshida

(10) Patent No.: US 6,786,505 B2
(45) Date of Patent: Sep. 7, 2004

(54) AIRBAG DEVICE

(75) Inventor: Ryoichi Yoshida, Shiga (JP)

(73) Assignee: Takata Corporation, Tokyo (JP)

( * ) Notice: Subject to any disclaimer, the term of this patent is extended or adjusted under 35 U.S.C. 154(b) by 52 days.

(21) Appl. No.: 10/208,750

(22) Filed: Aug. 1, 2002

(65) Prior Publication Data

US 2003/0034638 A1 Feb. 20, 2003

(30) Foreign Application Priority Data

Aug. 17, 2001 (JP) ........................................ 2001-247810
Aug. 17, 2001 (JP) ........................................ 2001-247811

(51) Int. Cl.7 ........................ B60R 21/24; B60R 21/28
(52) U.S. Cl. .................... 280/729; 280/730.1; 280/732; 280/739; 280/743.1
(58) Field of Search ............................. 280/729, 730.1, 280/732, 739, 743.1

(56) References Cited

U.S. PATENT DOCUMENTS

| | | | |
|---|---|---|---|
| 3,642,303 A | | 2/1972 | Irish et al. |
| 3,768,830 A | * | 10/1973 | Hass .......................... 280/729 |
| 3,887,213 A | * | 6/1975 | Goetz ......................... 280/738 |
| 4,262,931 A | * | 4/1981 | Strasser et al. ............. 280/729 |
| 5,282,646 A | * | 2/1994 | Melvin et al. .............. 280/729 |
| 5,562,302 A | | 10/1996 | Turnbull |
| 5,566,972 A | | 10/1996 | Yoshida et al. |
| 5,577,765 A | * | 11/1996 | Takeda et al. .............. 280/729 |
| 5,584,508 A | * | 12/1996 | Maruyama et al. ....... 280/743.1 |
| 5,593,179 A | | 1/1997 | Maruyama |
| 5,906,391 A | * | 5/1999 | Weir et al. .................. 280/729 |
| 6,237,949 B1 | * | 5/2001 | Nozumi et al. ............. 280/735 |
| 6,270,113 B1 | * | 8/2001 | Wipasuramonton et al. ..... 280/730.2 |
| 6,536,800 B2 | * | 3/2003 | Kumagai et al. ......... 280/743.1 |
| 6,554,316 B2 | * | 4/2003 | Schneider et al. ........ 280/743.1 |
| 2003/0030254 A1 | * | 2/2003 | Hasebe ....................... 280/729 |

FOREIGN PATENT DOCUMENTS

| | | |
|---|---|---|
| EP | 0593172 A1 | 9/1993 |
| JP | 09-188216 | 7/1997 |
| JP | 2001-213262 | * 8/2001 |

* cited by examiner

*Primary Examiner*—Paul N. Dickson
*Assistant Examiner*—George D Spisich

(57) ABSTRACT

An airbag device includes an airbag that is deployed in front of a passenger's seat of a car, and an inflator for supplying gas to deploy the airbag. The airbag includes a lower bag segment for holding shoulders and a chest of an adult passenger when it is deployed, an upper bag segment that rises from the lower bag segment so as to hold a head of the adult passenger when it is deployed, and a partition cloth having an inner vent hole for separating the lower and upper bag segments. The inflator supplies the gas directly to the lower bag segment, and then to the upper bag segment through the inner vent hole.

10 Claims, 8 Drawing Sheets

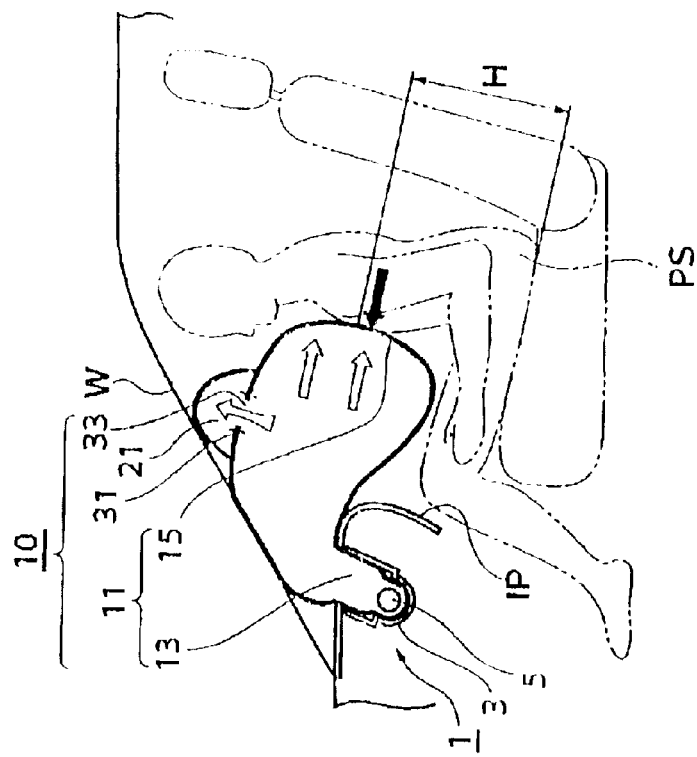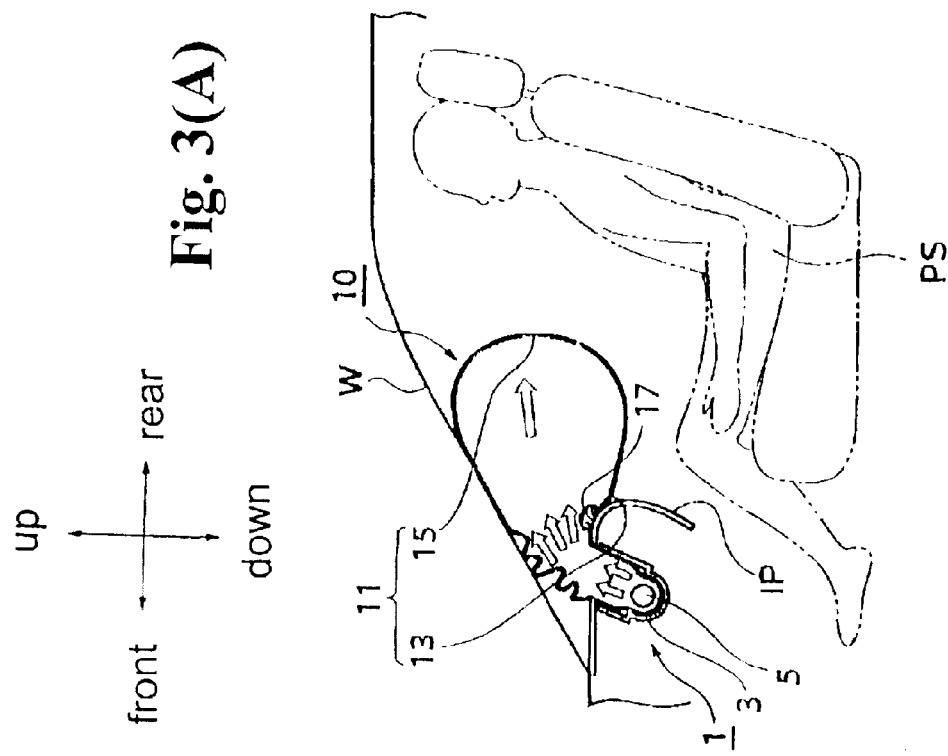

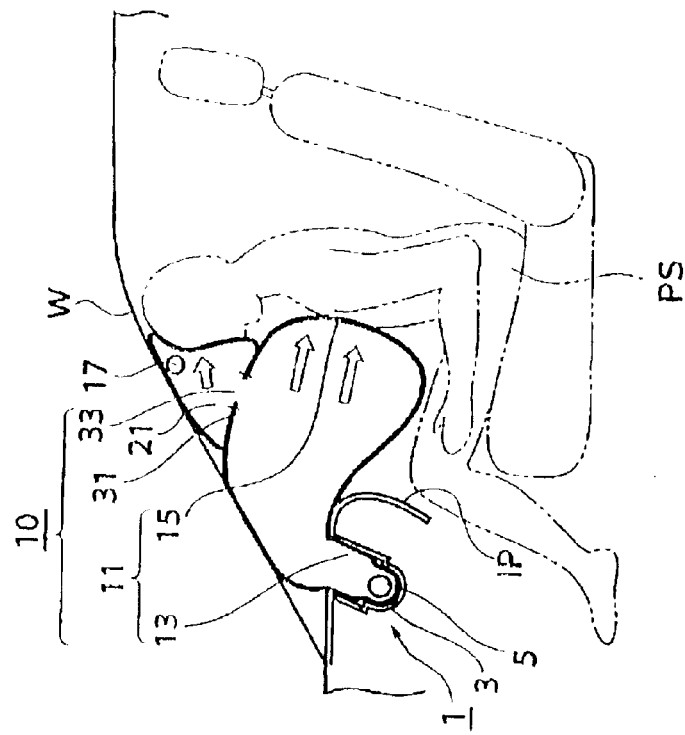
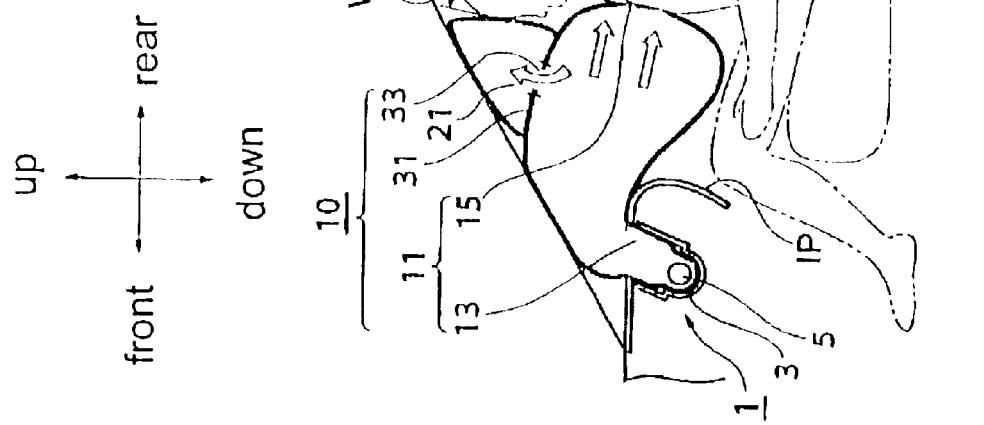

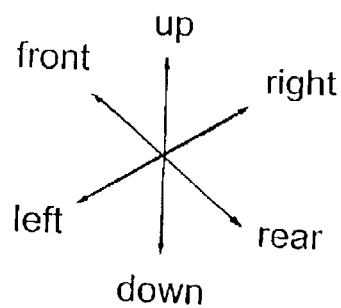
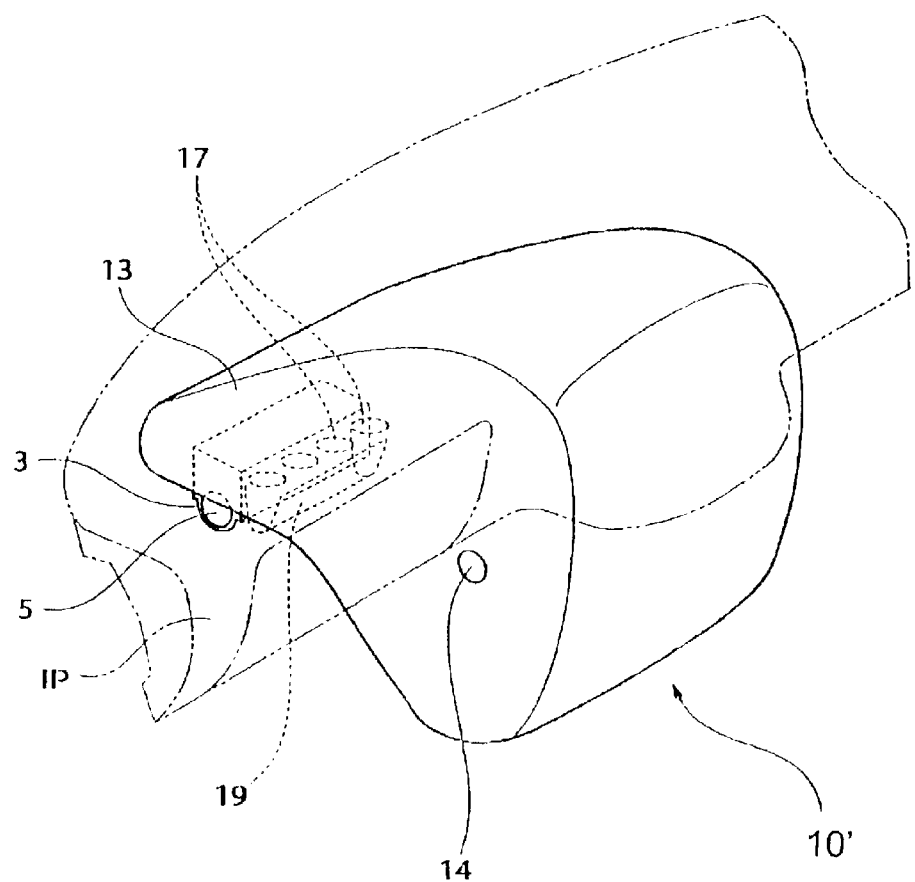
Fig. 5

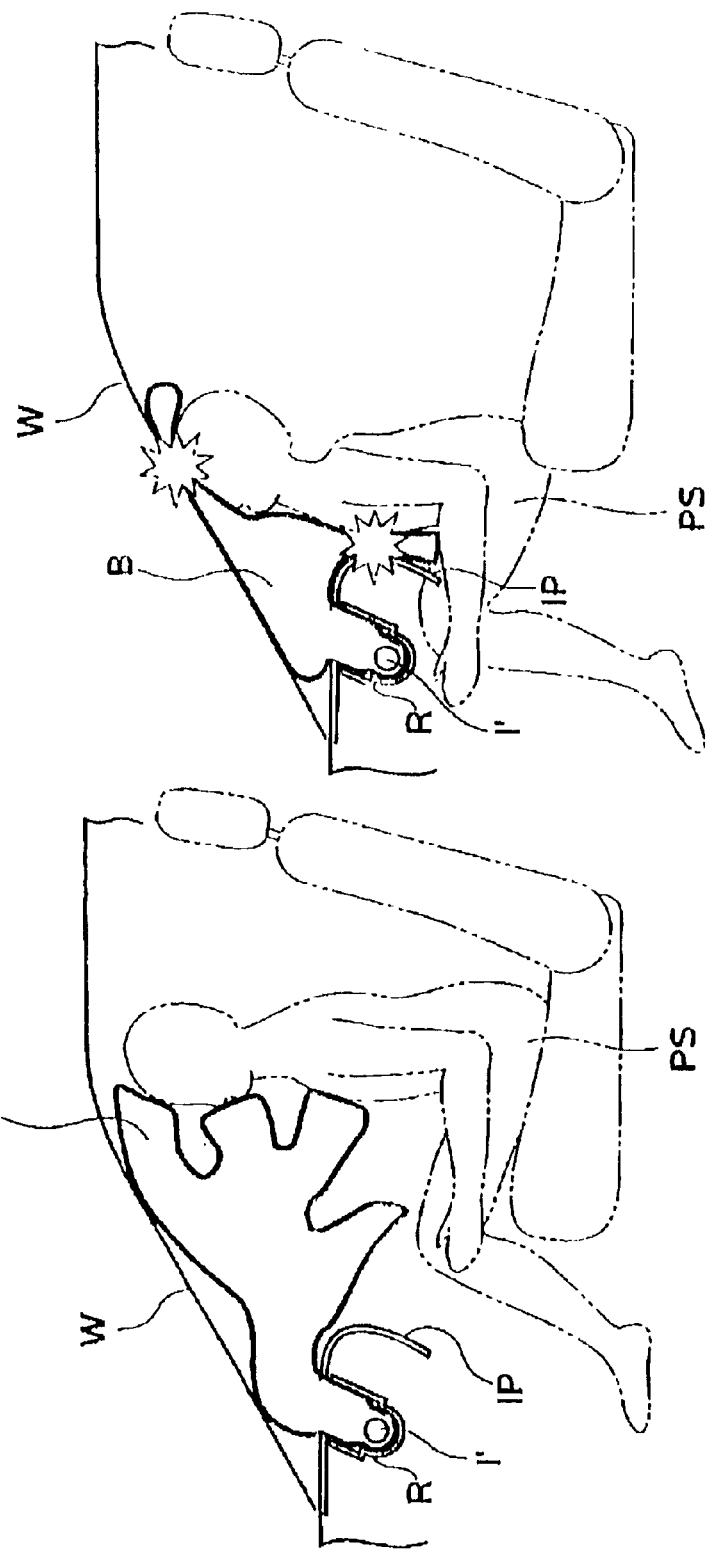

AIRBAG DEVICE

BACKGROUND OF THE INVENTION AND RELATED ART STATEMENT

The present invention relates to an airbag device for protecting an occupant by deploying an airbag in a case of a vehicle collision. More particularly, the present invention relates to an airbag device that can quickly deploy an airbag into an adequate shape even with a low-output inflator.

Airbag devices, such as a driver-side airbag device, a passenger-side airbag device, a rear-side airbag device, and a side-protection airbag device, are used in order to protect the occupant in a case of emergency like a vehicle collision. Among various airbag devices, a whole structure of the passenger-side airbag device is stored in an instrument panel at a front of a vehicle cabin.

FIGS. 6(A) and 6(B) are schematic side views showing a manner of deployment in a conventional passenger-side airbag device. FIG. 6(A) shows a state during deployment, and FIG. 6(B) shows a state in which the passenger contacts the deployed airbag.

The airbag device shown in FIGS. 6(A) and 6(B) includes a retainer R placed in an upper part of an instrument panel IP of a vehicle so as to face a windshield W. A bag-shaped bag body B and an inflator I for supplying gas into the bag body B are stored in the retainer R. The bag body B is normally folded and stored in the retainer R.

A typical capacity of the deployed bag body B is 100 to 130 liters. A supply output of the inflator I is typically 400 to 550 kPa for a 60-liter tank.

The airbag device shown in FIGS. 6(A) and 6(B) operates as stated below. When the inflator I supplies the gas into the bag body B upon a vehicle collision, an upper part of the bag body B expands along the windshield W of the vehicle, and a lower part of the bag body B is deployed close to upper legs of a passenger PS, as shown in FIG. 6(A). The bag body B is completely deployed after a predetermined time, and the passenger PS that is moving forward because of inertia contacts the deployed bag body B, as shown in FIG. 6(B). After that, the bag body B absorbs the force of inertial of the passenger body.

In general, a passenger-side bag has a capacity larger than that of a driver-side bag (approximately double). Thus, an inflator for promptly deploying the passenger-side bag is required to have an output higher than that for the driver-side bag. However, if there is an obstacle just behind the instrument panel IP, an impact applied to the obstacle during the deployment becomes larger as the output of the inflator increases.

Accordingly, the output of the inflator of the airbag device may be simply reduced in order to minimize the impact. However, when only the inflator output is decreased without changing other structures of the airbag device, the following problem arises.

FIGS. 7(A) and 7(B) are schematic side views showing a manner of deployment of a passenger-side airbag in which the output of the inflator is intentionally decreased. FIG. 7(A) shows a state during deployment, and FIG. 7(B) shows a state in which the passenger advances toward the deployed airbag.

FIGS. 7(A) and 7(B) show an operation and problems with the inflator with a decreased output in the airbag device. Namely, upon a vehicle collision, an inflator I' supplies gas into a bag body B. In case the inflator output is decreased, even though the bag body B is deployed in a range from a head to a waist of the passenger PS, as shown in FIG. 7(A), it is not yet completely deployed by the time when the passenger PS advances thereto. For this reason, in the worst case, the force of inertial of the passenger PS may not be sufficiently absorbed, as shown in FIG. 7(B).

On the other hand, U.S. Pat. No. 3,642,303 discloses an airbag having a lower bag segment and an upper bag segment. In this airbag device, the bag is structured to have a head bag (an upper bag segment) placed on a torso bag (a lower bag segment) with an orifice therebetween. When the bag is inflated, a trunk of a passenger first contacts the torso bag, and the applied impact causes gas in the torso bag to flow into the head bag through the orifice. This enables to use the gas efficiently.

The present invention has been made in view of such a background, and an object of the invention is to provide an airbag device that can quickly deploy an airbag into an adequate shape even with a low-output inflator.

Further objects and advantages of the invention will be apparent from the following description of the invention.

SUMMARY OF THE INVENTION

In order to overcome the above problems, an airbag device of the present invention includes an airbag that is deployed in front of a passenger's seat of a car, and an inflator for injecting gas to deploy the airbag. The airbag includes a lower bag segment for holding shoulders and a chest of an adult passenger when it is deployed, an upper bag segment that rises from the lower bag segment so as to hold a head of the adult passenger when it is deployed, and a partition cloth having an inner vent hole for separating the lower and upper bag segments. The inflator supplies the gas directly to the lower bag segment, and then to the upper bag segment through the inner vent hole.

In the airbag device of the present invention, when the bag is deployed, the lower bag segment is first inflated so as to hold the shoulders and chest of the adult passenger and keep the passenger from advancing. Accordingly, the device can support an upper body of the passenger more effectively than that disclosed in U.S. Pat. No. 3,624,303 in which the lower bag segment contacts a middle part of the adult passenger. The gas supplied from the lower bag segment through the inner vent hole deploys the upper bag segment. When the passenger is pressed into the lower bag segment, a part of the gas in the lower bag segment is transferred to the upper bag segment. Due to this mechanism, it is possible to restrain the passenger more reliably than the conventional airbag device even when the inflator output is low.

In the airbag device of the present invention, it is preferable that a capacity of the deployed lower bag segment be 60 to 90 liters. In this case, the lower bag segment can be deployed at a high speed even with the low-output inflator due to the relatively small capacity of the lower bag segment.

In the airbag device of the present invention, it is preferable that the output of the inflator be 300 to 400 kPa for a 60-liter tank. In this case, as the output of the inflator is low, the impact on an obstacle caused by the bag deployment can be reduced.

In the airbag device of the present invention, it is preferable that the upper bag segment be shaped like a triangular prism pointing upward with a capacity of 20 to 40 liters when it is deployed. It is also preferable that a space be formed between a front side of the deployed bag and a windshield. In this case, the output of the inflator may be further decreased as the capacity of the upper bag segment becomes smaller.

In the airbag device of the present invention, a plurality of inner vent holes may be formed in a rear side of the partition cloth so as to be spaced from one another at left and right sides, and the upper bag segment may have a gas-discharging vent hole. In this case, since a gas-discharging path can be secured from the lower bag segment to the upper bag segment through the gas-discharging vent hole in a relatively early stage of the bag deployment, the impact on an obstacle caused by the deployment can be reduced.

In the airbag device of the present invention, it is preferable that a rear surface of the upper bag segment be disposed slightly offset from a rear surface of the lower bag segment toward a front side when the airbag is deployed. Consequently, a surface of the upper bag segment for receiving the head of the occupant is placed ahead of a surface of the lower bag segment for receiving the shoulders and chest of the occupant. In this case, the lower bag segment is first deployed so as to restrain the shoulders and chest of the passenger, and a portion to be squashed of the lower bag segment on the rear side of the upper bag segment starts to be squashed. The gas from the squashed portion flows into the upper bag segment through the inner vent hole, so that the upper bag segment is gradually deployed.

Since the rear surface of the upper bag segment is disposed slightly offset to the front side, when the upper bag segment is almost completely deployed, the head of the passenger is brought into contact with the upper bag segment, and is received by the soft upper bag segment. While the passenger is advancing, the lower bag segment is further squashed, and the gas continuously flows into the upper bag segment. A part of the gas, which is not necessary to restrain the head of the passenger, is discharged from the vent holes formed in the right and left sides of the upper bag segment. Consequently, the deployed upper bag segment remains soft and can softly restrain the head of the passenger.

In the airbag device of the present invention, the airbag may be folded so that a base portion is offset to the rear side, and other portions are folded like bellows in front of the base portion. In this case, when the airbag hits an obstacle during the deployment, a leading end of the bag can easily pass between the obstacle and the windshield. For this reason, the impact on the obstacle is reduced.

In the airbag device of the present invention, the lower bag segment of the airbag may have a gas-discharging vent hole at the base portion on the lower side thereof. The above-described folding manner makes it possible to preferentially deploy the airbag from a rear side of the base portion. In this case, since the gas is discharged out of the bag through the vent hole so as to reduce the impact due to the bag deployment when the bag is not deployed in a usual manner, it is possible to reduce the impact on the obstacle in a bag deploying direction caused by the bag deployment. In contrast, when the bag is normally deployed, the vent hole is covered as it contacts the upper surface of the instrument panel, and therefore, little gas is released.

BRIEF DESCRIPTION OF THE DRAWINGS

FIGS. 3(A) to 3(D) are schematic side views showing an operation of the airbag device of the present invention, wherein FIG. 3(A) shows an initial state of the deployment (the first stage), and FIG. 3(B) shows a state in which the bag starts to contact a passenger (the second stage), FIG. 3(C) shows a state in which a head of the passenger starts to contact an upper bag segment (the third stage), and FIG. 3(D) shows a state in which the passenger is almost stopped advancing (the fourth stage);

FIG. 5 is a perspective view showing a configuration of an airbag device when a bag is completely deployed;

FIGS. 6(A) and 6(B) are schematic side views showing a deployment of a conventional passenger-side airbag device, wherein FIG. 6(A) shows a state during the deployment, and FIG. 6(B) shows a state in which a passenger contacts a deployed airbag; and FIGS. 7(A) and 7(B) are schematic side views showing a deployment of another conventional passenger-side airbag device in case an inflator output is intentionally decreased, wherein FIG. 7(A) shows a state during the deployment, and FIG. 7(B) shows a state in which a passenger advances toward a deployed airbag.

DETAILED DESCRIPTION OF PREFERRED EMBODIMENTS

Figure 1:
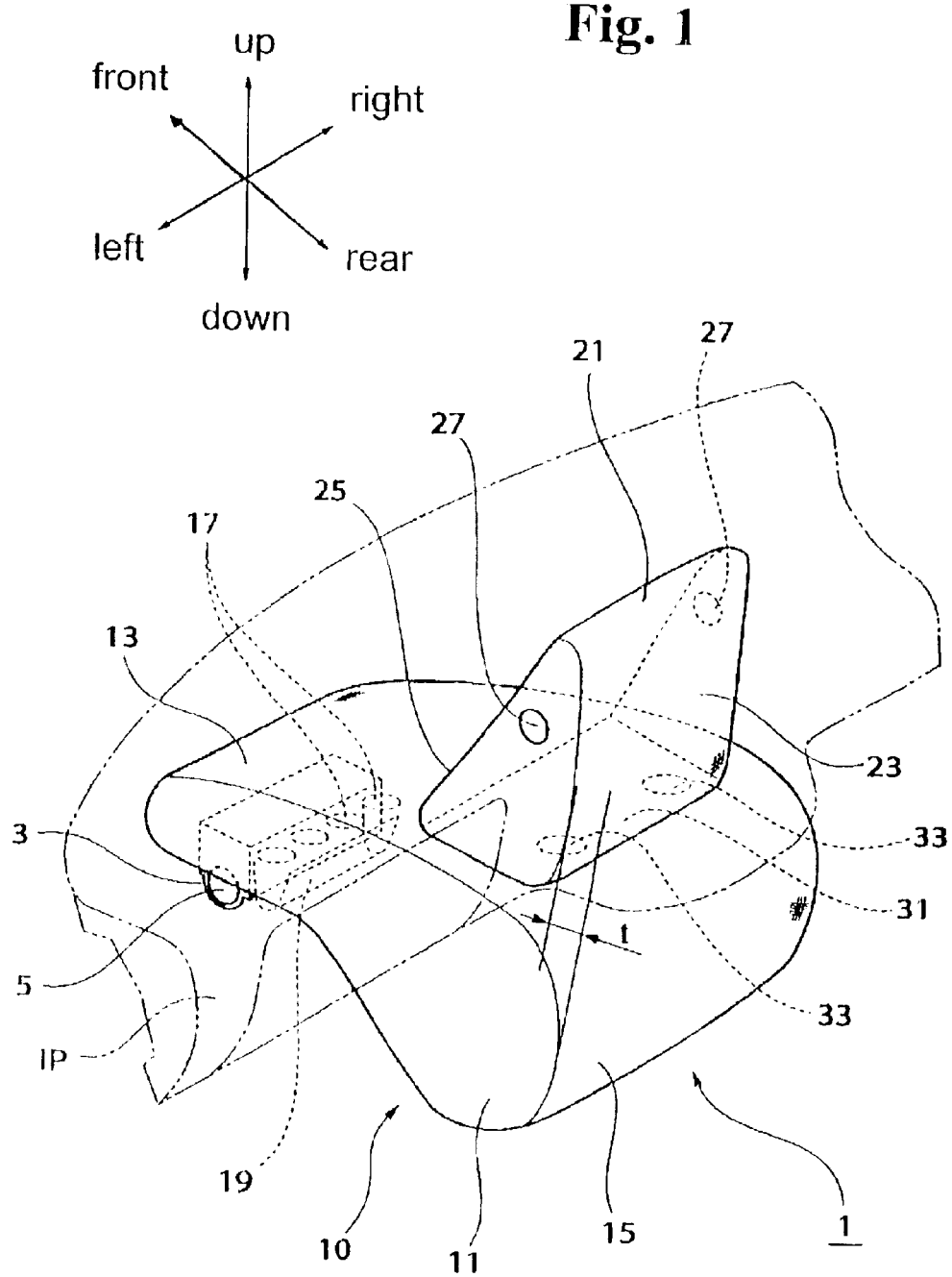
FIG. 1 is a perspective view showing a configuration of an airbag device according to an embodiment of the present invention when a bag is completely deployed.
Figure 2:
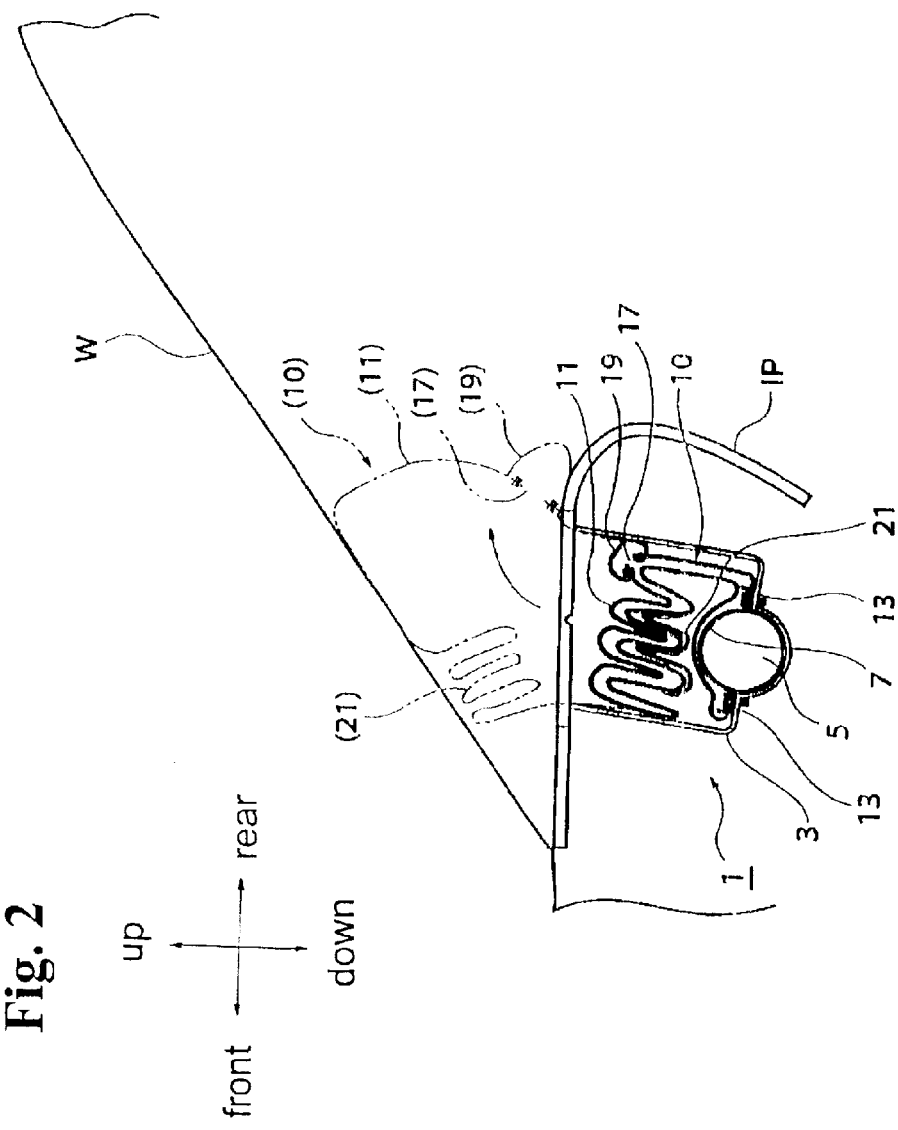
FIG. 2 is a sectional view showing the configuration of the airbag device before and at the beginning of the bag deployment.

Hereunder, embodiments of the invention will be explained with reference to the accompanied drawings. FIG. 1 is a perspective view showing a configuration of an airbag device according to an embodiment of the present invention when a bag is completely deployed. FIG. 2 is a sectional view showing the configuration of the airbag device before and at the beginning of the bag deployment.

In the drawings, arrows indicate upward, downward, rightward, leftward, frontward, and rearward directions in the following description.

An airbag device 1 of this embodiment is an airbag device for a passenger's seat. As shown in FIGS. 1 and 2, a retainer 3 of the airbag device 1 is placed in an upper part of an instrument panel IP of a vehicle to face a windshield W of the vehicle. As shown in FIG. 2, the retainer 3 accommodates a bag-shaped bag body 10 and an inflator 5.

The bag body 10 is formed in a bag shape made of nylon or the like. The bag body 10 includes a lower bag segment 11, an upper bag segment 21, and a partition cloth 31 disposed between the bag segments 11 and 21, as shown in FIG. 1.

First, the lower bag segment 11 will be described. The lower bag segment is formed in a bag shape that gradually expands downward from front to rear when it is deployed. A capacity of the deployed lower bag segment 11 is typically 60 to 90 liters. An aperture at a base portion 13 of the lower bag segment 11 is fixed to a bottom of the retainer 3 with a bag plate 7, as shown in FIG. 2. A rear surface 15 of the lower bag segment 11 expands to a position where the lower bag segment can hold shoulders and chest of an adult passenger upon deployment.

Gas-discharging vent holes 17 are formed near the base portion 13 of the lower bag segment 11 at a side of the passenger so as to open downward, as shown in FIG. 1. In this embodiment, four gas-discharging vent holes 17, each having a diameter of 40 to 60 mm, are arranged in the rightward-leftward direction. While a total area of the gas-discharging vent holes 17 may be appropriately changed depending on the inflator output, it is 50 to 120 cm² in this embodiment. As long as the number of the gas-discharging vent holes 17 is at least two, the total area thereof may be appropriately determined within the above range. When the number is decreased, the opening area of each vent hole needs to be increased. A hood 19 is attached to an outer side of the base portion 13 of the lower bag segment 11. The hood 19 is made of the same material as that of the bag body 10, for example, nylon. The hood 19 is extended in an arch shape outside the vent holes 17 when the gas is discharged. An operation of the vent holes 17 and the hood 19 will be described later.

Next, the upper bag segment 21 will be described. The upper bag segment 21 is formed in like a triangular prism pointing upward to protrude from the lower bag segment 11 when it is deployed. A capacity of the deployed upper bag segment 21 is typically 20 to 40 liters. A rear surface 23 of the upper bag segment 21 reaches a position where the upper bag segment can hold the head of the adult passenger when the airbag is deployed. When the bag is deployed, the rear surface 23 of the upper bag segment 21 is positioned offset by more than 50 mm, i.e. a gap "t" in FIG. 1, from the rear surface 15 of the lower bag segment 11 toward the front side. Because of this gap "t", the upper bag segment 23 does not contact the passenger's head during the deployment, but contacts the passenger's head when it is almost completely deployed, thereby softly restraining the passenger's head. When the bag is deployed, a space is formed between a front surface 25 (front-side surface) of the upper bag segment 21 and the windshield W. Gas-discharging vent holes 27 (having, for example, a diameter of 50 mm) are formed on right and left upper side faces of the upper bag segment 21. Gas-discharging vent holes 14 may be formed on side faces of the lower bag segment as shown in FIG. 5.

The partition cloth 31 will be described. The partition cloth 31 is arranged so as to separate the lower bag segment 11 and the upper bag segment 21. The partition cloth 31 has inner vent holes 33. A diameter of the inner vent holes 33 is typically 50 to 70 mm. In this embodiment, two inner vent holes 33 with a diameter of 60 mm are formed on right and left rear sides with a space therebetween. The inner vent holes 33 absorb the kinetic energy of the passenger by discharging gas therethrough in a normal bag deploying operation, and secure a gas-discharging path when the bag body 10 hits an obstacle during the deployment.

In a folded state before the deployment, as shown in FIG. 2, the bag body 10 with such a configuration is stored so that the base portion 13 of the lower bag segment 11 is offset to the rear side, and the other portions are folded like bellows in the front side of the base portion 13. Such a storage manner allows the lower side of the lower bag segment 11 of the bag body 10 to expand first during the deployment, as shown by a phantom line in FIG. 2. A manner of subsequent bag deployment will be described later with reference to FIGS. 3(A) to 4.

Next, the inflator 5 will be described. The inflator 5 is a device to generate gas for deploying the bag body 10. An output of the inflator 5 is set to be relatively low at 300 to 400 kPa as the maximum output for a capacity of 60 liters. The inflator 5 is shaped like a cylinder having a cylindrical outer peripheral surface, and accommodates a propellant (not shown). An initiator (not shown) is connected to the inflator 5. The initiator ignites the propellant inside the inflator 5 in response to an ignition signal from a sensor (not shown). There is another type of inflator for deployment by using highly pressurized inert gas.

Next, an operation of the airbag device 1 having the above configuration will be described. In a normal state of the vehicle, the bag body 10 is folded and stored in the retainer 3 (see FIG. 2). When the vehicle is rapidly decelerated, the sensor (not shown) detects the deceleration and sends the ignition signal to the initiator. The initiator ignites the propellant, and the inflator 5 generates the inflation gas. The generated inflation gas is first directly supplied to the lower bag segment 11, and is then supplied to the upper bag segment 21 through the inner vent holes 33 of the partition cloth 31.

An operational process of the bag body 10 in a normal state will be described in detail below with reference to FIGS. 3(A) to 3(D). It is assumed that a passenger PS is an adult, and does not wear the seat belt.

FIGS. 3(A) to 3(D) are schematic side views showing an operation of the airbag device of the present invention, wherein FIG. 3(A) shows an initial state of the deployment (the first stage), FIG. 3(B) shows a state in which the bag starts to contact a passenger (the second stage), FIG. 3(C) shows a state in which a head of the passenger starts to contact an upper bag segment (the third stage), and FIG. 3(D) shows a state in which the advance movement of the passenger is almost stopped (the fourth stage).

In the first stage, as shown in FIG. 3(A), the folded bag body 10 protrudes above the instrument panel IP, and starts to expand to the rear side. In this case, since the gas-discharging vent holes 17 in the base portion 13 of lower bag segment 11 close to the passenger are covered by the hood 19 contacting the upper surface of the instrument panel IP, gas is not almost lost from the vent holes 17.

In the second Stage, as shown in FIG. 3(B), the lower bag segment 11 is first quickly inflated, and expands toward the shoulders and chest of the adult passenger PS, and the lower bag segment rear surface 15 contacts the shoulders and chest of the passenger PS. Since the shoulders and chest keep moving forward, the passenger's head can not easily move toward the windshield W. The upper bag segment 21 starts to deploy by the gas from the lower bag segment 11, which is pressed and squashed by the shoulders and chest of the passenger PS, through the inner vent holes 33 of the partition cloth 31.

In the third Stage, as shown in FIG. 3(C), the bag body 10 is almost completely deployed, and the head of the passenger PS starts to contact the upper bag segment 21. In this case, since the gap "t" (see FIG. 1) is arranged between the rear surface 15 of the lower bag segment 11 and the rear surface 23 of the upper bag segment 21, the upper bag segment 23 does not contact the passenger's head during the deployment, but contacts the passenger's head when it is almost completely deployed, thereby softly restraining the passenger's head.

In the fourth Stage, as shown in FIG. 3(D), the bag body 10 is pressed and squashed by the passenger PS who is advancing further. Thus, the gas is discharged from the gas-discharging vent holes 27 formed on both sides of the upper bag segment 21, and a kinetic energy of the passenger PS is absorbed, so that the passenger PS is stopped moving. As a part of the gas is discharged from the gas-discharging vent holes 27, the passenger's head softly contacts the upper bag segment 21.

In this way, the airbag device 1 of this embodiment can properly deploy the bag body 10 even with the low-output inflator with the maximum output 300 to 400 kPa so as to properly restrain the passenger PS in a vehicle collision.

The airbag device 1 of the present invention also properly operates, for example, in a condition that there is an obstacle in front of the passenger's seat of the vehicle, as will be described below. An operation of the airbag device 1 will be described below in such a condition.

Figure 4:
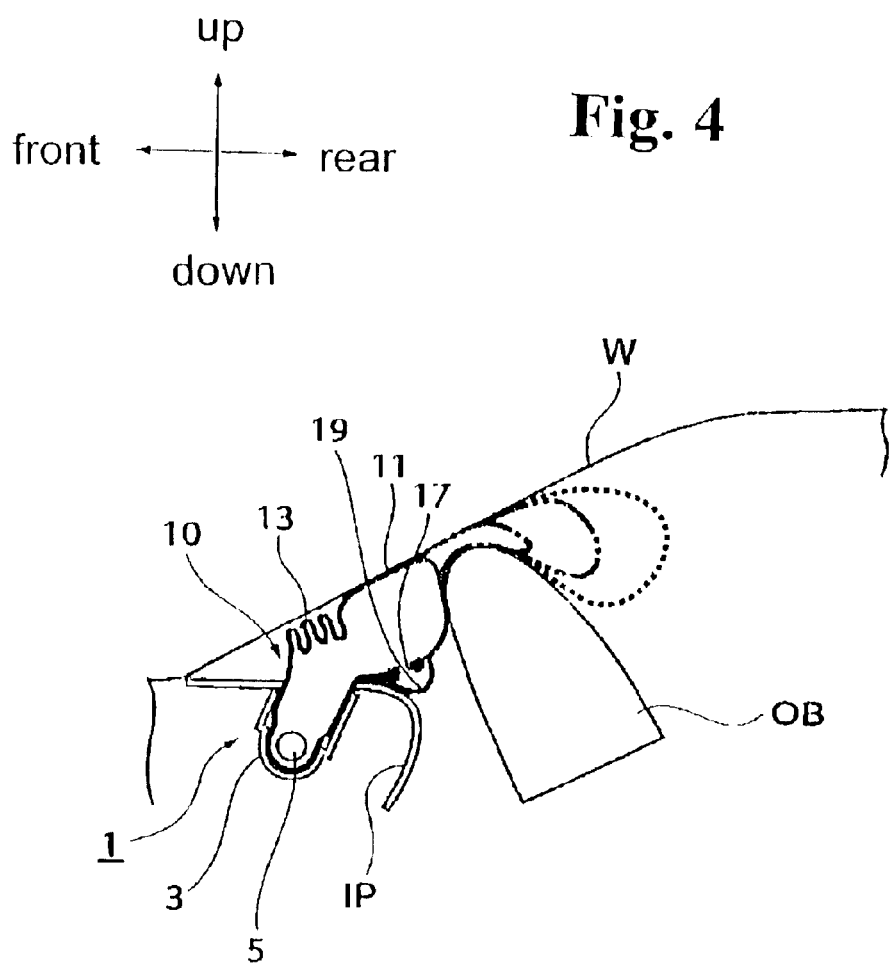
FIG. 4 is a schematic side view showing another operation of the airbag device of the present invention.
Figure 6A:
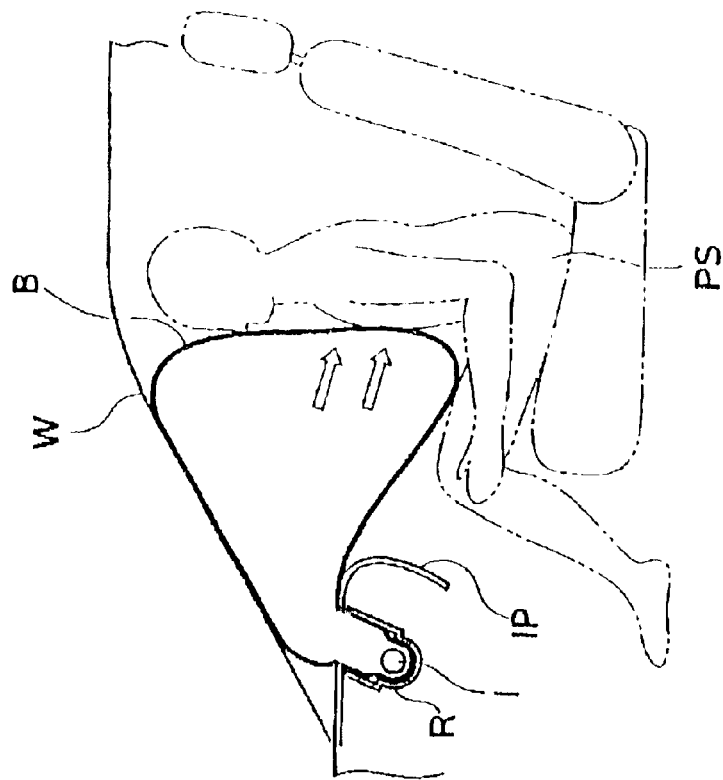
Figure 6B:
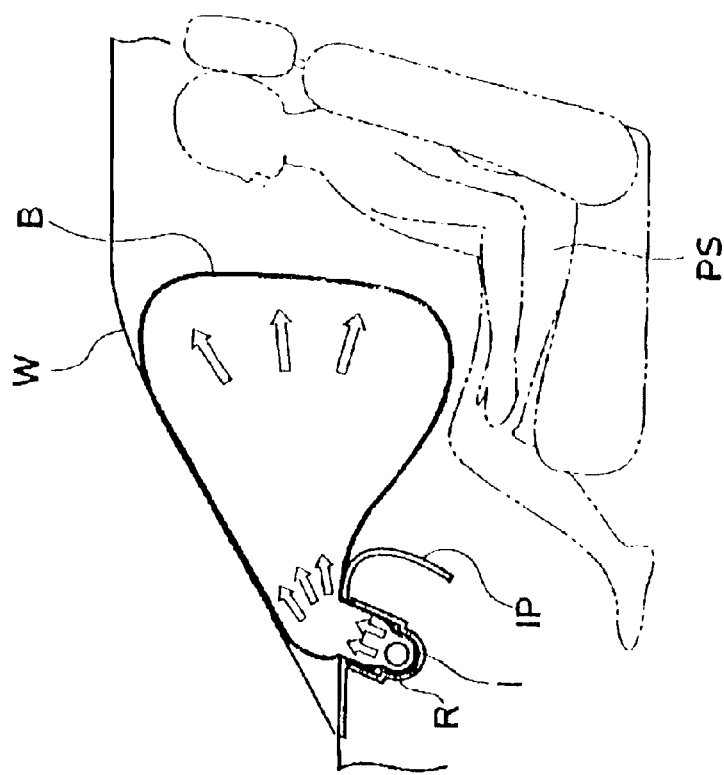

FIG. 4 is a schematic side view explaining the operation of the airbag device of the present invention. As shown in FIG. 4, it is assumed that an object OB exists just in front of the instrument panel IP that is disposed in front of the passenger's seat of the vehicle when the vehicle is rapidly decelerated. When the airbag device 1 is actuated, the bag body 10 folded and stored in the retainer 3 first protrudes above the instrument panel IP (shown by a solid line in FIG. 4). Then, the lower portion of the lower bag segment 11 of the bag body 10 relatively close to the base portion 13 contacts a front upper portion of the object OB at the beginning of the deployment, and the normal bag deployment is obstructed. In this case, the gas-discharging vent holes 17 in the base portion 13 of the lower bag segment 11 are still open without contacting the upper surface of the instrument panel IP. Therefore, the gas is discharged out of the bag through the vent holes 17, so that a force for deploying the bag is decreased, and the impact on the object OB is reduced.

Subsequently, the portions of the lower bag segment 11 folded like bellows sequentially pass between the top of the object OB and the windshield W due to a folding characteristic in the stored state. The bag body 10 is deployed in an order shown by a projected line, a phantom line, and a hidden line in FIG. 4. Since the deployment is carried out in such an order, impact on the object OB due to the bag deployment is reduced, and the object OB hardly rebounds. The folding manner of the bag body 10 is not limited to that shown in FIG. 2, and any folding manner may be adopted as long as a portion of the bag having the gas-discharging vent holes 17 fixed to the retainer 3 close to the passenger is first deployed.

In the above embodiment, the bag body 10 is formed of the lower bag segment 11 and the upper bag segment 21. However, the bag body 10' which includes the gas-discharge vent holes 17 with the hood 19 may be formed without the upper bag segment, as shown in FIG. 5. In this case, the vent holes 14 are formed in the bog body 10'. Although the upper bag segment is not formed, in case the inflator is properly selected or the shape of the bag body 10' is properly arranged, the bag body 10' can operate properly, as in the bag body 10. In case the object OB is present in front of the instrument panel, the gas is properly ejected through the vent holes 17.

The airbag device of the present invention can serve as a multistage inflation system in combination with a weight sensor and a crash severity sensor. The gas charge rate may be set low for infants and children, and high for adult passengers. Alternatively, the gas charge rate may be set relatively low when he vehicle speed is low (deployment with a low ON-SET rate), and may be set high when the vehicle speed is medium to high (deployment with a high ON-SET rate) The airbag device may be used in combination with a seating sensor, a capacitive sensor, an image processing system, and the like.

As is obvious from the above description, the present invention can provide the airbag device that can quickly deploy the airbag into an adequate shape even with the low-output inflator.

While the invention has been explained with respect to the specific embodiments of the invention, the explanation is illustrative and the invention is limited only by the appended claims.

What is claimed is:

1. An airbag device for protecting an occupant in a vehicle, comprising:

an inflator for providing inflation gas, and an airbag connected to the inflator to be deployed in front of the occupant, said airbag including a lower bag segment for holding shoulders and chest of the occupant having a gas-discharging vent hole on a rear side thereof, an upper bag segment disposed on the lower bag segment for holding a head of the occupant when the airbag is deployed, a partition cloth situated between the upper and lower bag segments for separating the same and having an inner vent hole so that said inflation gas from the inflator is directly supplied to the lower bag segment first to deploy the lower bag segment from the rear side and then to the upper bag segment through the inner vent hole, and a hood formed under the gas-discharging vent hole for closing the gas-discharging vent hole when the airbag contacts an instrument panel upon inflation of the airbag.

2. An airbag device according to claim 1, wherein said partition cloth includes a plurality of inner vent holes with a space between.

3. An airbag device according to claim 1, wherein said upper bag segment includes a rear surface disposed slightly offset from that of the lower bag segment toward a front side of the vehicle when the airbag is deployed.

4. An airbag device according to claim 1, wherein said upper bag segment includes first gas-discharging vent holes in right and left side faces thereof.

5. An airbag device according to claim 1, wherein said lower bag segment includes a base portion so that when the airbag is folded, the base portion is offset to a rear side of the vehicle, and other portion of the airbag is folded in bellows in front of the base portion.

6. An airbag device according to claim 1, wherein a capacity of said lower bag segment is set to be 60 to 90 liters when the airbag is deployed.

7. An airbag device according to claim 1, wherein said upper bag segment is formed in a triangular prism shape pointing upward, and has a capacity of 20 to 40 liters.

8. An airbag device for protecting an occupant in a vehicle, comprising:

an inflator for providing inflation gas, and an airbag connected to the inflator to be deployed in front of the occupant, said airbag including a bag segment for holding the occupant having a gas-discharging vent hole on a rear side thereof, said inflation gas from the inflator being directly supplied to the bag segment to deploy the bag segment from the rear side, and a hood formed under the gas-discharging vent hole for closing the gas-discharging vent hole when the airbag contacts an instrument panel upon inflation of the airbag.

9. An airbag device according to claim 8, wherein said hood is arranged such that when the airbag does not contact the instrument panel upon inflation of the airbag, the vent hole is not covered by the hood to release the gas therethrough.

10. An airbag device according to claim 9, wherein said bag segment further includes gas-discharging vent holes in right and left side faces thereof.

* * * * *